US006594437B1

(12) United States Patent
Nicolas (10) Patent No.: US 6,594,437 B1
(45) Date of Patent: Jul. 15, 2003

(54) OPTICAL FIBER SEPARATION AND REGROUPING DEVICE

(75) Inventor: Arnaud Nicolas, Mechanicsburg, PA (US)

(73) Assignee: FCI Americas Technology, Inc., Reno, NV (US)

( * ) Notice: Subject to any disclaimer, the term of this patent is extended or adjusted under 35 U.S.C. 154(b) by 51 days.

(21) Appl. No.: 09/638,768

(22) Filed: Aug. 15, 2000

(51) Int. Cl.⁷ .................................................. G02B 6/00
(52) U.S. Cl. ...................................................... 385/139
(58) Field of Search ............................. 385/139, 117, 385/119, 58, 59, 98, 99

(56) References Cited

U.S. PATENT DOCUMENTS

| | | | |
|---|---|---|---|
| 3,883,222 A | | 5/1975 | Gunderson ................ 350/96 C |
| 4,653,849 A | | 3/1987 | Boirat et al. ............. 350/96.22 |
| 4,653,850 A | | 3/1987 | Boirat et al. ............. 350/96.22 |
| 4,671,607 A | | 6/1987 | Laude ...................... 350/96.15 |
| 4,753,515 A | * | 6/1988 | Sato et al. ..................... 385/59 |
| 4,812,010 A | * | 3/1989 | Osaka et al. .................... 385/96 |
| 4,931,959 A | * | 6/1990 | Brenner et al. ............. 359/107 |
| 4,943,136 A | | 7/1990 | Popoff ..................... 350/96.16 |
| 4,995,692 A | | 2/1991 | Diliello et al. ........... 350/96.16 |
| 5,009,477 A | | 4/1991 | Alferness et al. ........ 350/96.15 |
| 5,020,871 A | | 6/1991 | Nishimura ................. 350/96.1 |
| 5,155,785 A | | 10/1992 | Holland et al. ............... 385/89 |
| 5,239,609 A | | 8/1993 | Auteri ........................ 385/136 |
| 5,303,373 A | | 4/1994 | Harootian, Jr. ............. 385/115 |
| 5,309,538 A | * | 5/1994 | Larson ......................... 385/98 |
| 5,444,804 A | * | 8/1995 | Yui et al. ...................... 385/49 |
| 5,546,491 A | * | 8/1996 | Loch ............................ 385/99 |
| 5,604,830 A | * | 2/1997 | Kuder et al. .................. 385/59 |
| 5,682,453 A | * | 10/1997 | Daniel et al. ................. 385/99 |
| 5,694,509 A | * | 12/1997 | Uemura et al. ............... 385/99 |
| 5,732,181 A | * | 3/1998 | Engberg et al. ............. 385/139 |
| 5,838,848 A | | 11/1998 | Laude ........................... 385/24 |
| 5,915,055 A | * | 6/1999 | Bennett et al. ................ 385/59 |
| 5,943,455 A | | 8/1999 | Travieso et al. .............. 385/24 |
| 5,999,674 A | * | 12/1999 | Yui et al. ...................... 385/49 |
| 6,181,845 B1 | | 1/2001 | Horsthuis et al. ............. 385/17 |
| 6,222,976 B1 | | 4/2001 | Shahid ........................ 385/134 |
| 6,229,933 B1 | | 5/2001 | Curzio et al. ................. 385/17 |

FOREIGN PATENT DOCUMENTS

WO       WO 99/13367        3/1999

OTHER PUBLICATIONS

"Schott Fiber Optics offers a solution to dense fiber routing with its Optical Shuffle," http://www.Schottfiberoptics.com/OptcShflLit.html, 2 pages, 2000.

* cited by examiner

Primary Examiner—Lynn D. Feild
Assistant Examiner—Hae Moon Hyeon
(74) Attorney, Agent, or Firm—Woodcock Washburn LLP

(57) ABSTRACT

A separation and regrouping device for conductive elements such as optical fibers is disclosed. The device includes a housing and a plurality of conductive elements extending through an interior region thereof. The housing surrounds encapsulation discontinuities formed on the conductive elements. The housing can include a guide channel that channels the optical fibers through the interior region thereof and, optionally, rotates the fibers as they extend through the housing. The device can also include strain relief elements that contain the optical fibers and surround the encapsulation discontinuities, and potting chambers in which the optical fibers can be potted to the housing. Methods for organizing conductive elements are also disclosed that include providing a plurality of conductive elements arranged in first groups, separating the first groups into individual conductive elements, and rearranging the individual conductive elements into second groups.

20 Claims, 8 Drawing Sheets

FIG. 6B

OPTICAL FIBER SEPARATION AND REGROUPING DEVICE

CROSS-REFERENCE TO RELATED APPLICATIONS

The subject matter disclosed herein is related to the subject matter disclosed in copending application Ser. No. 09/639,267, filed on even date herewith, entitled "Shuffle Device," the contents of which are hereby incorporated by reference.

FIELD OF THE INVENTION

This invention relates generally to a shuffle device, and more particularly, to an optical fiber separation and regrouping device for an optical shuffle.

BACKGROUND OF THE INVENTION

Optical fibers provide a well-known medium for conveying information in data and communications systems, such as computer and telephone systems. It is well known, that optical fibers possess characteristics wherein their light transmission capability is greatest when the fiber is straight and devoid of bends, and that they are subject to signal attenuation due to bending. These bending losses can be characterized as losses due to larger, gradual bends (macrobends), and losses due to much smaller and sharper bends (microbends). Macrobends can result from winding the fiber, for example, while microbends arise because of random variations in direction of the core axis.

Optical fibers, therefore, are typically provided with protective coatings to preserve the inherent strength of the glass and to buffer the fiber from microbending induced attenuation. Individual optical fibers can be encapsulated in a polymer casing that protects the fiber from damage, or an optical fiber ribbon can be formed by aligning a plurality of optical fibers in a linear array and then encapsulating the fiber array in a polymer casing to form the ribbon.

Two coatings are generally used to form a fiber optic cable or ribbon. The first coating, which is typically applied to the surface of the optical fiber, is generally referred to as the primary coating. The primary coating, once cured, is a soft, rubbery material that serves as a buffer to protect the fiber by relieving the stress created when the fiber is bent. The primary coating usually has a low glass transition temperature to provide resistance to microbending.

Certain characteristics are desirable for the primary coating. For example, the primary coating must maintain adequate adhesion to the glass fiber during thermal and hydrolytic aging, yet be strippable for splicing purposes. The modulus of the primary coating must be low to cushion and to protect the fiber by relieving stress on the fiber, which can induce microbending and, consequently, inefficient signal transmission. It is desirable for the primary coating to have a low glass transition temperature to ensure that the coating remains in a rubbery state throughout a broad temperature range.

The secondary or outer coating is applied over the primary coating. The secondary coating functions as a hard, protective layer that prevents damage to the glass fiber during processing and use by providing desired resistance to handling forces, such as those encountered when the coated fiber is cabled.

Additionally, it is often desirable to switch information between systems that use optical fibers as information conveyance media. This can be accomplished by directing the optical fibers output from each system into one or more systems. This is known as shuffling the fibers, and the mechanism by which this is accomplished is known as an optical shuffle. An optical shuffle in which one fiber output from each system is directed to a different system is known as a perfect shuffle. Thus, in a perfect shuffle, each system can communicate with every other system.

One way by which an optical shuffle can be formed is to strip the coatings from the fibers or ribbons inputted to the shuffle, and then "re-ribbonize" the exiting fibers. That is, the stripped fibers can be grouped differently, re-encapsulated, and then output from the shuffle. Thus, a discontinuity is created in the area of re-ribbonization, and the fibers can remain undesirably exposed in that region. Moreover, the fibers are prone to strain and bending in the area of the discontinuity.

There is a need in the art for a compact optical shuffle that permits re-ribbonization of a plurality of optical fibers, while protecting the fibers from damage and reducing strain and bending in the discontinuity. It is an objective of the present invention, therefore, to provide an optical fiber separation and regrouping device that protects and controls bending of the optical fibers at the discontinuity.

SUMMARY OF THE INVENTION

The present invention is a separation and regrouping device comprising a housing and a plurality of conductive elements, such as optical fibers, extending through an interior region of the housing. The optical fibers can be encapsulated individually as fiber optic cables, or grouped together and then encapsulated to form optical fiber ribbons.

Each optical fiber has a first coating disposed along a first portion thereof, and a second coating disposed along a second portion thereof. An encapsulation discontinuity is formed on each optical fiber between the first coating and the second coating. The housing can be pre-assembled or molded over the optical fibers to contain the optical fibers and surround the encapsulation discontinuities.

The interior region of the housing can include a guide channel that channels the optical fibers through the interior region of the housing. The guide channel can be a single channel, or can include a plurality of channels. The guide channel can also be twisted to rotate the fibers as they extend through the housing.

The device can also include one or more strain relief elements within the interior region of the housing that contain the optical fibers and surround the encapsulation discontinuities. A single strain relief element can contain a plurality of fibers, or the device can include a plurality of strain relief elements, each of which contains a single fiber.

To further reduce strain on the conductive elements, the housing can also include one or more potting chambers in which the optical fibers can be potted to the housing.

A method according to the invention for organizing conductive elements includes providing a plurality of conductive elements arranged in first groups, separating the first groups into individual conductive elements, and rearranging the individual conductive elements into second groups.

The first groups can be optical fiber ribbons, which are separated by unribbonizing the fibers (e.g., by stripping the encapsulation from the ribbon to expose the fibers). The unribbonized fibers can then be re-ribbonized (i.e., rearranged into a second group and encapsulated to form a second ribbon).

Thus, a method according to the invention for managing a plurality of conductive elements includes arranging a first section of the conductive elements in a first arrangement, arranging a second section of the conductive elements in a second arrangement, and enclosing a third section of the conductive elements located between the first and second sections.

The third section of the elements can be enclosed by inserting the conductive elements in a pre-assembled shuffle device, or by encapsulating the conductive elements such as by overmolding a housing over the third section, or by potting the third section within a tubular structure.

BRIEF DESCRIPTION OF THE DRAWINGS

The invention is further described in the accompanying drawings in which.

DETAILED DESCRIPTION OF PREFERRED EMBODIMENTS

Figures 1, 1A, 1B:
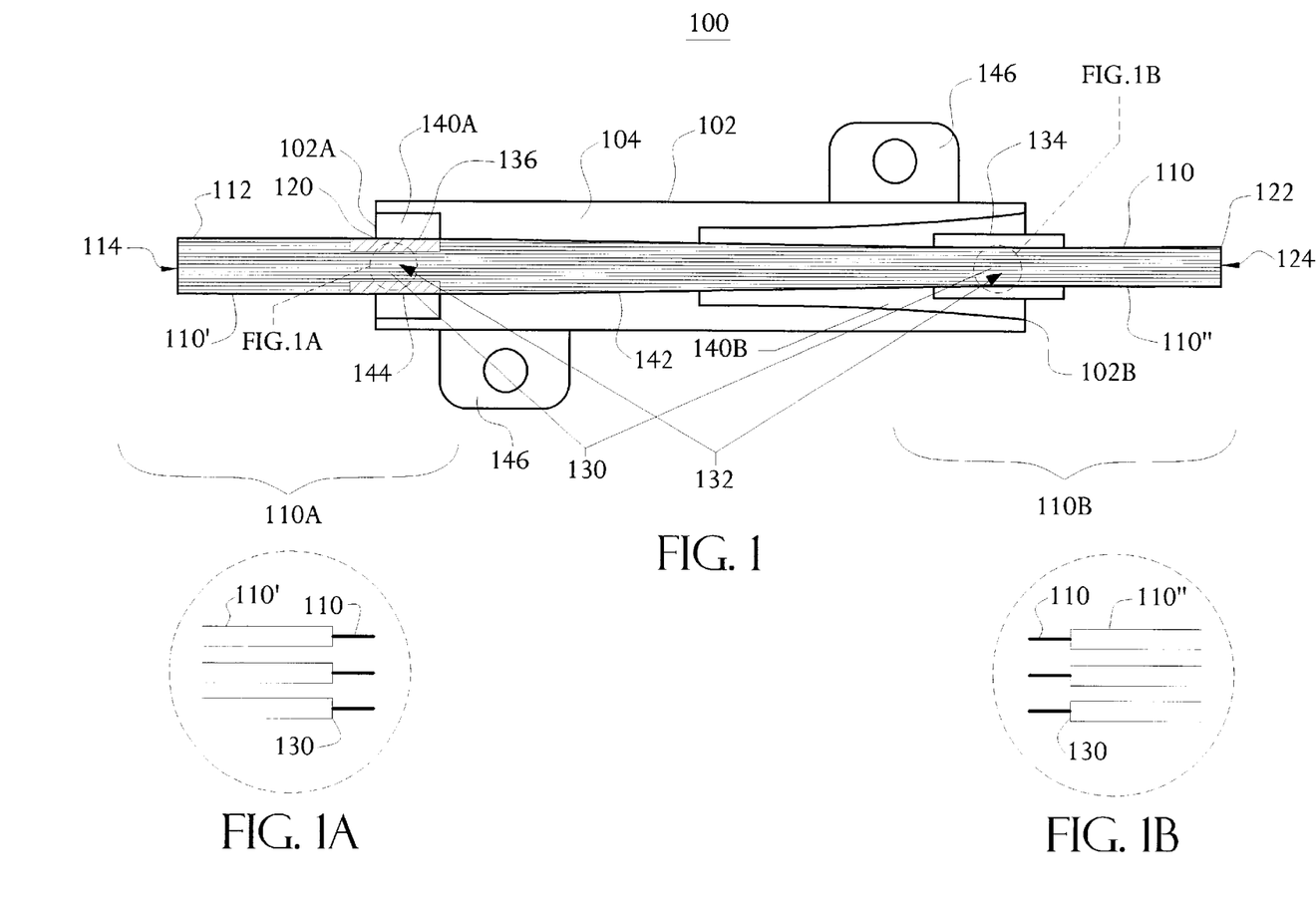
FIG. 1 is a longitudinal cross section of a preferred embodiment of a separation and regrouping device according to the present invention.
FIG. 1A provides an enlarged view of an input end of a separation and regrouping device according to the invention.
FIG. 1B provides an enlarged view of an output end of a separation and regrouping device according to the invention.

As shown in FIG. 1, a separation and regrouping (i.e., "shuffle") device 100 for conductive elements such as optical fibers comprises a housing 102, and a plurality of optical fibers 110. Housing 102 has an input end 102A, an interior region 104, and an output end 102B through which optical fibers 110 extend.

Each optical fiber 110 is coated with a respective first coating 110' disposed along a first, or input, portion 110A thereof. An individual optical fiber 110 can be coated along its input portion 110A to form an input cable 112, or a set of optical fibers 110 can be arrayed and coated together along their respective input portions to form an input ribbon 114. Device 100 can include any number of input cables 112 or input ribbons 114, or any combination of input cables 112 and input ribbons 114.

Figure 2:
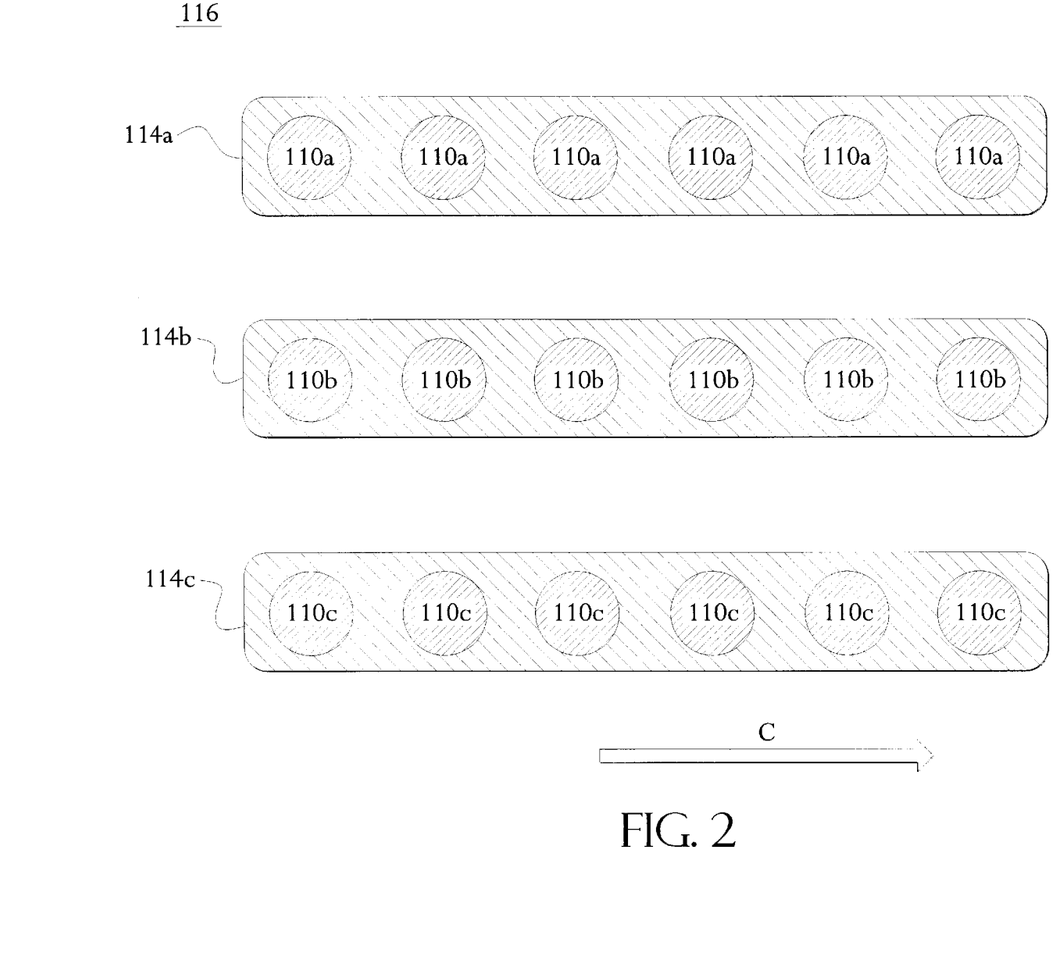
FIG. 2 is a cross sectional view of an exemplary input fiber matrix.

In a preferred embodiment, the set of input cables 112 and input ribbons 114 can be configured as an input fiber matrix 116 as shown in cross section in FIG. 2. As shown, input matrix 116 can include three input ribbons 114a–c, each having six optical fibers 110a–c, respectively, although input matrix 116 can comprise any number or combination of input ribbons 114 or input cables 112, and, in general, an input ribbon 114 can include any number of fibers from 1 to N. Thus, for purposes of this specification, an input cable 112 can be said to be an input ribbon 114 having only one optical fiber 110. Note that input matrix 116 is oriented so that the ribbons 114 are parallel to the direction indicated by arrow C.

The following describes a pre-assembled housing 102, which could be made from plastic or metal. With reference once again to FIG. 1, housing 102 is shown to include an input aperture 120 that receives the entire input fiber matrix 116. In a preferred embodiment of the present invention, input end 102A of housing 102 is adapted to receive an input fiber matrix 116 having twelve ribbons of twelve fibers each, although, in general, device 100 can be adapted to receive N ribbons having M(n) fibers each, where 1<=n<=N, and M(n) is the number of fibers included in ribbon n, with M(n)>=1.

To reduce the incidence of bending, housing 102 can include a guide channel 142 that guides fibers 110 through interior region 104 of housing 102. Preferably, guide channel 142 includes a plurality of channels 144 that extend through housing 102. Each channel 144 is sized and shaped to accommodate either a discrete cable 112 or a ribbon 114 of fibers.

Each optical fiber 110 is coated with a respective second coating 110" disposed along a second, or output, portion 110B thereof. An individual optical fiber 110 can be coated along its output portion 110B to form an output cable 122, or a set of optical fibers 110 can be arrayed and coated together along their respective output portions to form an output ribbon 124. Device 100 can include any number of output cables 122 or output ribbons 124, or any combination of output cables 122 and output ribbons 124, although the total number of optical fibers 110 that extend through output end 102B of housing 102 should equal the number of optical fibers 110 that extend through input end 102A of housing 102. That is, optical fibers are neither created nor destroyed within device 100, they are merely separated (if they are part of an input ribbon) and regrouped (to form an output ribbon) as will be described below. Thus, in general, device 100 can be used to transform N ribbons having M(n) fibers, into X ribbons having Y(x) fibers, where 1<=x<=X, and Y(x) is the number of fibers included in ribbon x, with Y(x)>=1.

Figure 3A:
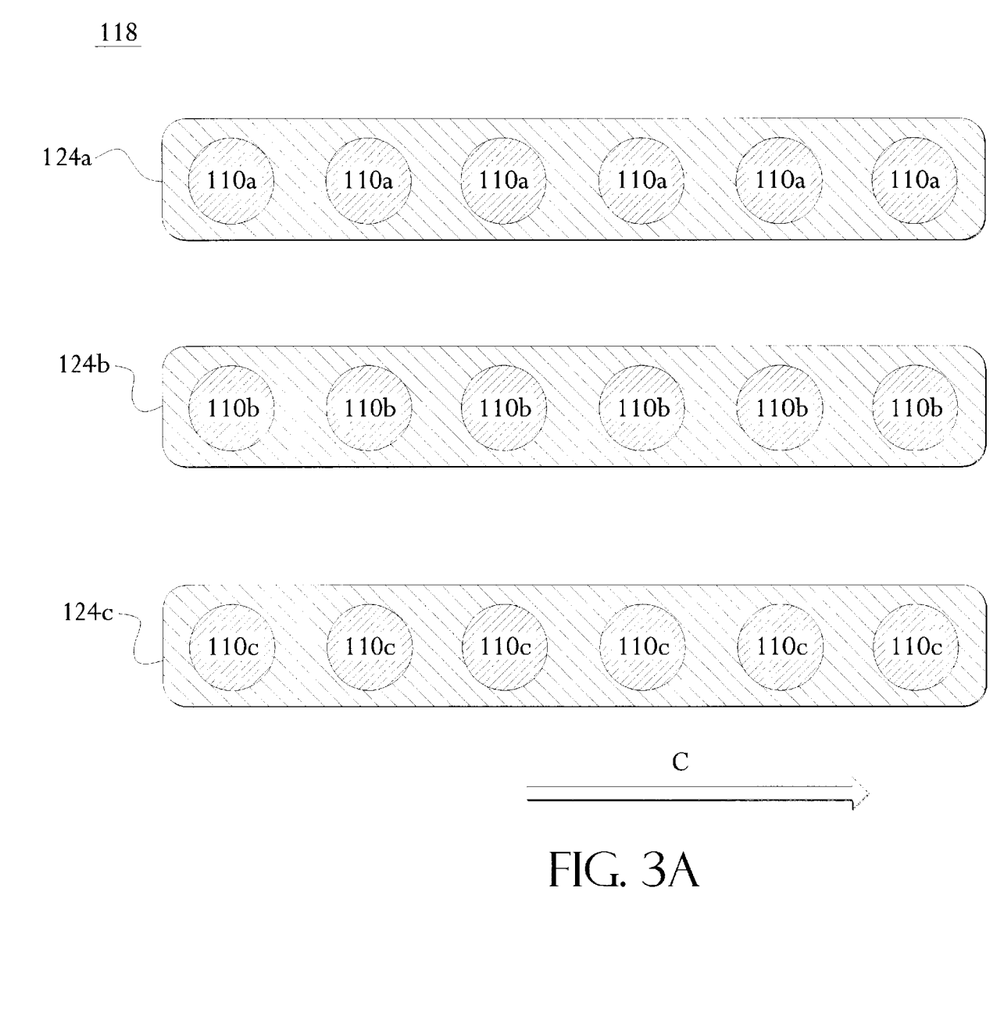
FIGS. 3A and 3B are cross sectional views of an unrotated output fiber matrix before and after re-ribbonization.
Figure 3B:
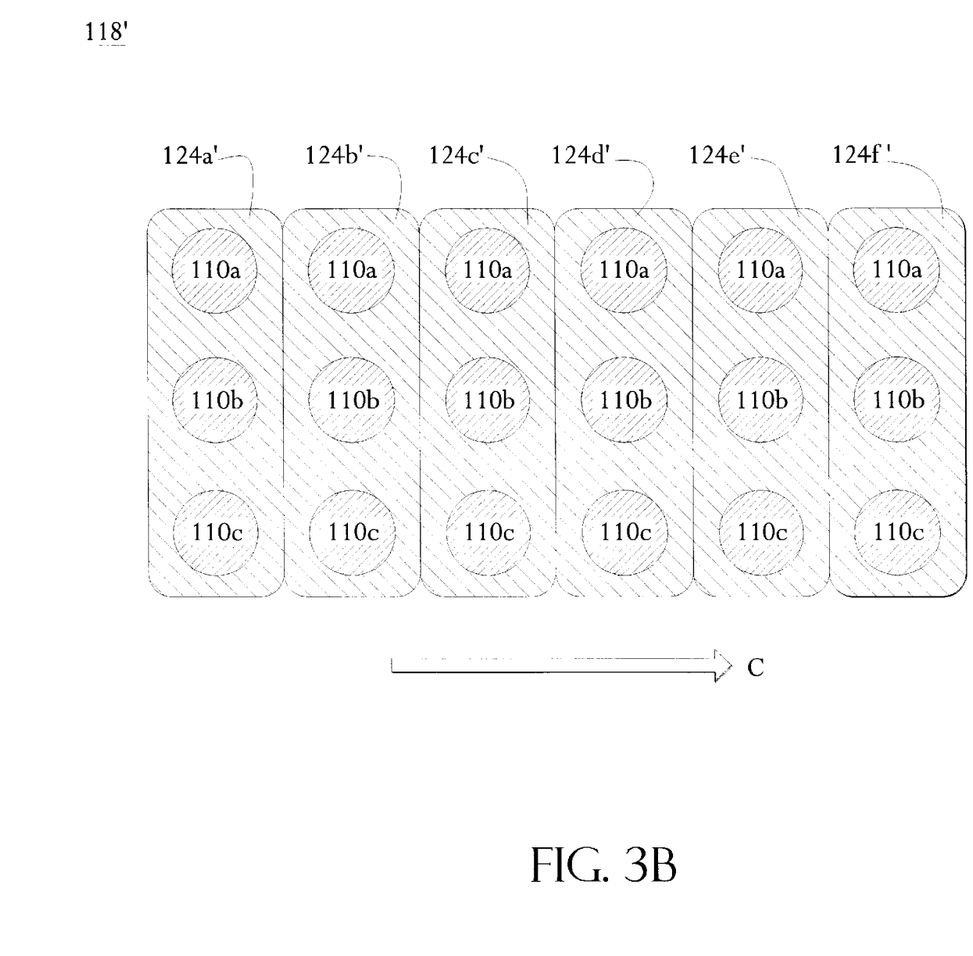

Although any or all of the input ribbons can extend through housing 102 and emerge from output end 102B in the same configuration (i.e., the same fibers are grouped together on output as on input), device 100 can be used to separate the array of fibers that form an input ribbon 114, and then regroup and re-ribbonize a second array of fibers, on the output side of the device, to form an output ribbon 124. FIGS. 3A and 3B provide cross sectional views of an unrotated output fiber matrix 118 before and after re-ribbonization. Note that, in FIG. 3A, output matrix 118 is oriented so that output ribbons 124 are parallel to the direction indicated by arrow C, while in FIG. 3B, re-ribbonized output matrix 118' is oriented so that output ribbons 124' are perpendicular to the direction indicated by arrow C.

Output matrix 118 can be re-ribbonized in any manner known to those in the art, although it is preferred that the encapsulation is removed from a distal portion of each ribbon by peeling, or through the use of chemicals or heat strippers, or by any other suitable technique known in the art, to expose optical fibers 110. The exposed fibers are preferably encapsulated to form a plurality of output ribbons 124a–f. The ribbons, in combination, form within chamber 140B, an output ribbon matrix 118'. Preferably, each output ribbon 124a–f includes one fiber 110 from each input ribbon 114a–c.

Thus, it is the process of re-ribbonizing the output fiber matrix that causes the optical fibers 110 to have a first coating 110' disposed along first portion 110A thereof and a second coating 110" disposed along second portion 110B thereof. As shown in FIG. 1, a respective encapsulation discontinuity 130 is formed on each optical fiber 110 where optical fiber 110 has no coating (i.e., the between its first, or input, coating 110', and its second, or output, coating 110"). Preferably, all the respective encapsulation discontinuities 130 are formed in the same general area, or region 132, within housing 102.

FIGS. 1A and 1B provide enlarged views of the input and output ends of the device, respectively, thereby better showing the detail of the encapsulation discontinuities 130.

To further reduce the incidence of bending, fiber separation and regrouping device 100 can also include one or more optional strain relief elements. Device 100 can include a single strain relief element 134 that surrounds all the fibers 110 in region 132 at the output end of housing 102. Preferably, strain relief element 134 is a small, plastic tube that contains a plurality of fibers (preferably, all of them) to keep them from bending in region 132. Alternatively, or additionally, device 100 can include one or more individual strain relief elements 136 that surround the respective discontinuities 130 of individual optical fibers 110 or where the ribbons 114 have been separated into discrete cables 112 at the input end of housing 102. Preferably, each strain relief element 136 is a small, plastic tube that contains an individual optical fiber 110 to keep it from bending at its encapsulation discontinuity 130.

To still further reduce bending, the input and output fiber matrixes can be potted (e.g., epoxied) to housing 102. To accomplish this, housing 102 can include an input potting chamber 140A for potting input cables 112 and input ribbons 114. Similarly, housing 102 can include an output potting chamber 140B for potting output cables and ribbons. The potting chambers 140A, 140B can be filled with epoxy or other such potting material to hold the fibers in place. This stabilizes the fibers (and strain relief elements 134, 136, if present) and thereby reduces strain. Thus, device 100 can serve to enclose the fibers, without the need for any additional housing. As shown in FIG. 3B, output ribbons 124' are oriented in the same direction as input ribbons 112a–c (see FIG. 2). Although it, it should be understood that, in general, output ribbons 124' can be oriented in any direction relative to input ribbons 112, it is preferred, for routing purposes, that output ribbons 124' are in the same orientation as input ribbons 112, that is, generally parallel to the direction of arrow C. To accomplish this, a device according to the present invention can be used to rotate the ribbon matrix as it extends though the housing so that, after re-ribbonization, the output ribbons are oriented in the same direction as the input ribbons.

Device 100 can also include one or more mounting members 146 that extend from housing 102. Mounting members 146 can be used to mount device 100 to one or more substrates, such as printed circuit boards (PCBs).

It is known that the optical fibers are prone to both macrobending and microbending at their respective encapsulation discontinuities 130. In an alternative embodiment to the pre-assembled housing, housing 102 could be molded over the optical fibers at region 132 to contain the fibers and reduce the incidence of bending in region 132. In this embodiment, housing 102 can be made of a polymer, such as plastic, and is molded over the optical fibers.

Figure 4:
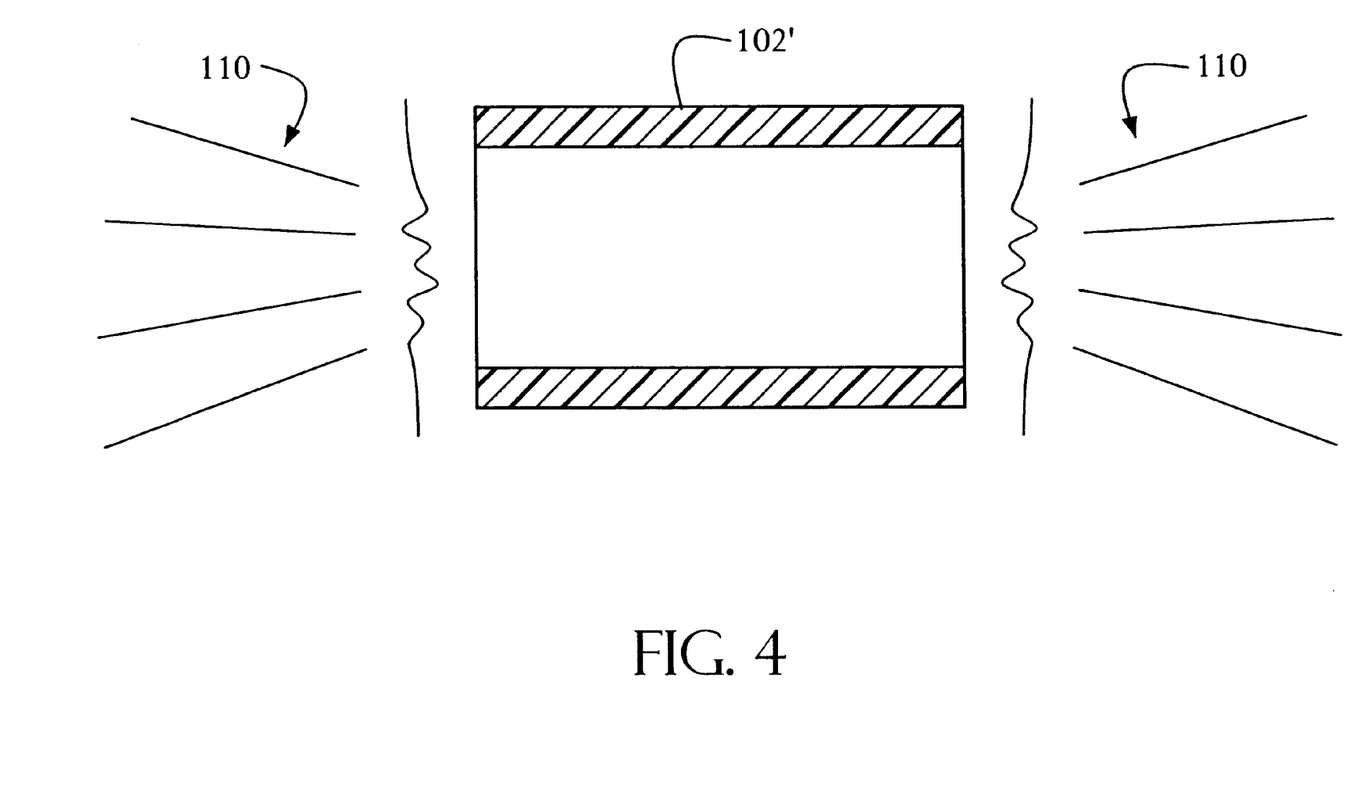
FIG. 4 is a longitudinal cross section of an alternative embodiment of a separation and regrouping device according to the present invention.

In another embodiment, shown in FIG. 4, housing 102' could be a generally tubular structure with open ends and an open interior. Once the fibers 110 are passed therethrough, housing 102' could then be potted with known materials, such as epoxy. The epoxy fills the remainder of the open interior of the housing not occupied by the fibers. The epoxy retains the fibers in position and provides strain relief.

Figure 5:
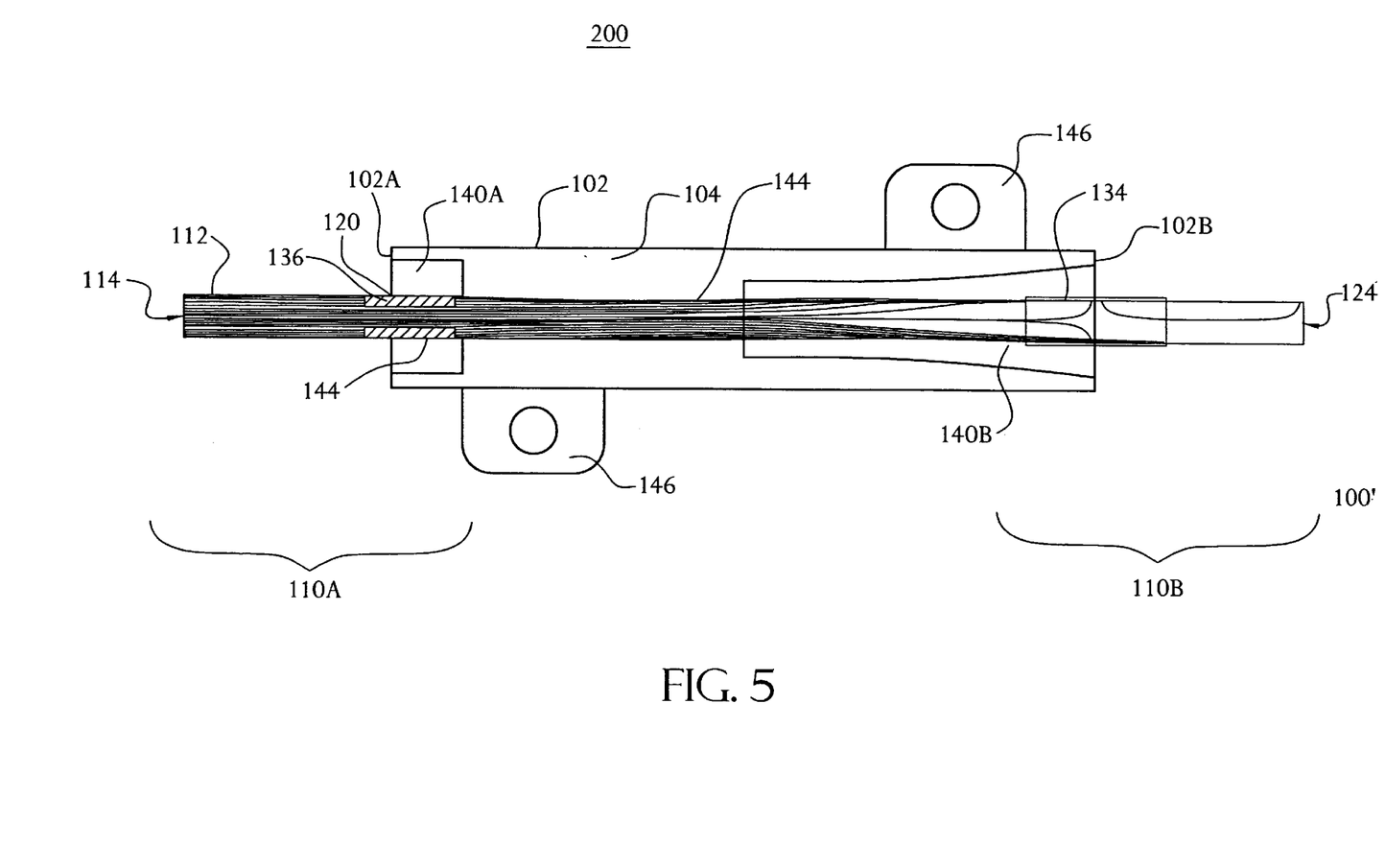
FIG. 5 is a longitudinal cross section of still another preferred embodiment of a separation and regrouping device according to the present invention.
Figure 6A:
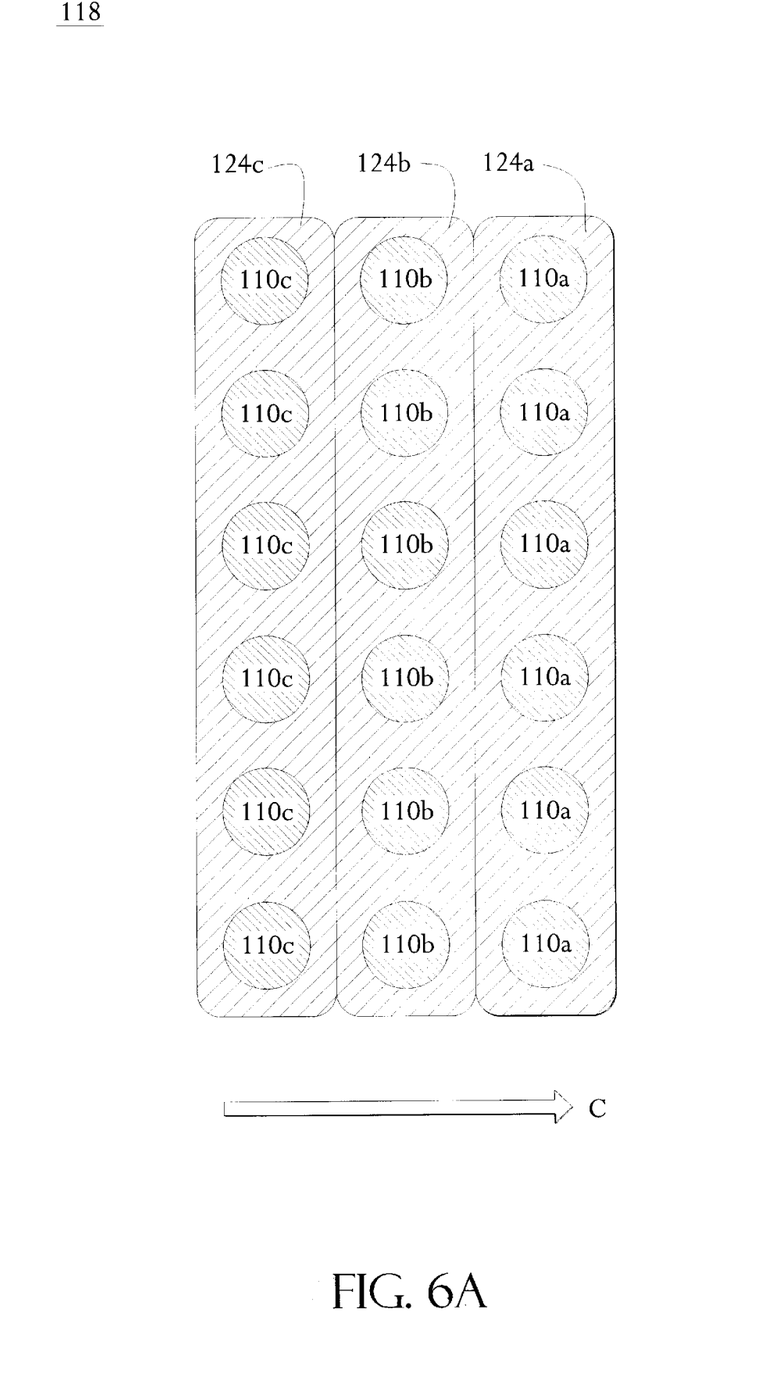
FIGS. 6A and 6B are cross sectional views of a rotated output fiber matrix before and after re-ribbonization.
Figure 6B:
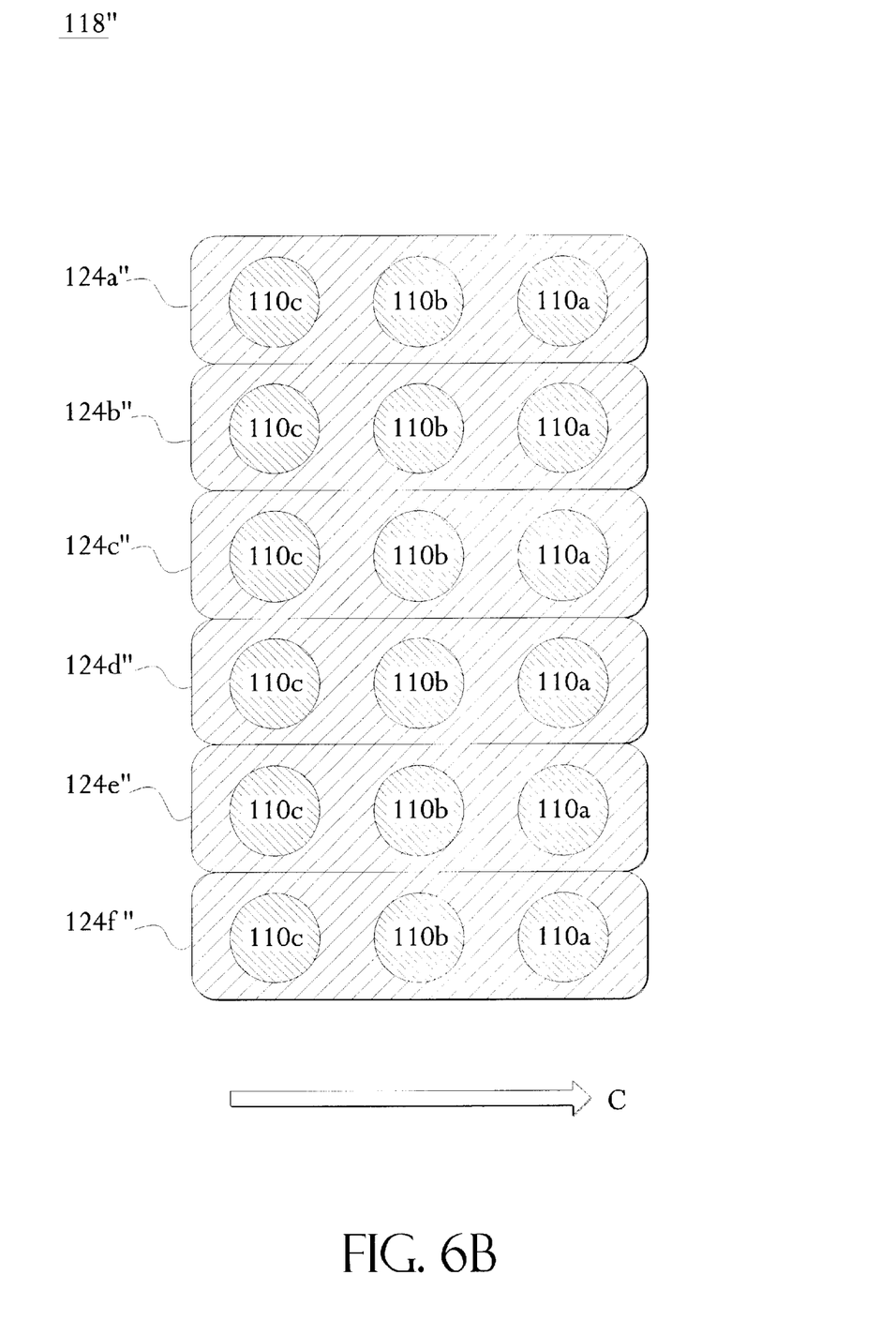

FIG. 5 shows a cross-section of a shuffle device 200 for separating and regrouping optical fibers that includes twisted guide channels 144. Device 200 is similar to device 100, except that channels 144 are twisted. As the input fiber matrix extends through housing 102, the fiber matrix is rotated from a first orientation at input end 102A (as shown in FIG. 2) into a second orientation at output end 102B (as shown in FIG. 6A) because of the twists. Output fiber matrix 118 can now be "re-ribbonized," as described above, to form a rotated re-ribbonized output fiber matrix 118", a cross sectional view of which is depicted in FIG. 6B. Note that output ribbons 124" a–f are once again parallel to the direction given by arrow C.

Although the output fiber matrix can, in general, have any orientation relative to the orientation of the input fiber matrix, (i.e., guide channel 144 can be twisted to rotate the fiber matrix any number of degrees), it is preferred that guide channel 144 is twisted to rotate the fiber matrix approximately 90 degrees so that the output ribbons after re-ribbonization can be made parallel to the input ribbons. This helps to reduce the overall size of the device.

A fiber device according to the present invention can be sized for any application, although it is usually desirable that the device be as small as possible, especially for applications where available space is limited. For example, in a preferred embodiment, device 100 can be about 50 mm long and have a cross section of about 10 mm×10 mm.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. A fiber separation and regrouping device, comprising:
    a housing having an input end, an output end, and an interior region extending between the input end and the output end thereof; and
    a plurality of optical fibers extending through the interior region of the housing, each said optical fiber having a respective first coating disposed along a first portion thereof and a respective second coating disposed along a second portion thereof, wherein a respective encapsulation discontinuity is formed on each said optical fiber between the respective first coating and the respective second coating,
    wherein the housing is molded over the optical fibers to contain the optical fibers and surround the respective encapsulation discontinuities.

2. The device of claim 1, further comprising:
    at least one strain relief element within the interior region of the housing that contains at least one of the optical fibers and surrounds the respective encapsulation discontinuity of the at least one optical fiber.

3. The device of claim 2, wherein the strain relief element contains the plurality of fibers and surrounds the respective encapsulation discontinuities.

4. The device of claim 1, further comprising a plurality of strain relief elements within the interior region of the housing, each of the plurality of strain relief elements containing one of the optical fibers and surrounding the respective encapsulation discontinuity thereof.

5. The device of claim 1, wherein the housing comprises an input potting chamber proximate the input end thereof in which the optical fibers are potted to the housing.

6. The device of claim 5, wherein the housing comprises an output potting chamber proximate the output end thereof in which the optical fibers are potted to the housing.

7. The device of claim 1, wherein the input end of the housing includes plurality of input apertures through which optical fibers extend into the interior region thereof.

8. The device of claim 1, wherein a first subset of the plurality of optical fibers form an input fiber optic ribbon extending through the input end of the housing and a second subset of the plurality of optical fibers form an output fiber optic ribbon extending through the output end of the housing, wherein the second subset is different from the first subset.

9. The device of claim 1, wherein at least a subset of the plurality of optical fibers form an output fiber optic ribbon extending through the output end of the housing.

10. The device of claim 1, wherein the interior region of the housing includes a guide channel that channels the optical fibers through the interior region of the housing.

11. The device of claim 1, wherein the interior region of the housing includes a twisted guide channel that rotates the optical fibers as they extend through the housing.

12. A method of organizing conductive elements, comprising the steps of:
   providing a plurality of conductive elements arranged in first groups;
   separating said first groups into individual conductive elements;
   rearranging said individual conductive elements into second groups; and
   extending said conductive elements through a shuffle device such that said first groups extend through a first end of said shuffle device and said second groups extend through a second end of said shuffle device;
   wherein each said conductive element has a respective first encapsulation discontinuity proximate said first end of said shuffle device, and a respective second encapsulation discontinuity proximate said second end of said shuffle device.

13. The method as recited in claim 12, wherein said first groups comprise ribbons, and said separating step comprises unribbonizing said first groups.

14. The method as recited in claim 13, further comprising the step of placing said second group in ribbons.

15. The method as recited in claim 12, wherein the rearranging step produces second groups different from said first groups.

16. A method of managing a plurality of conductive elements, comprising the steps of:
   arranging a first section of said conductive elements in a first arrangement;
   arranging a second section of said conductive elements in a second arrangement; and
   enclosing in a housing a third section of said conductive elements located between said first and second sections,
   wherein each said conductive element has a respective first encapsulation discontinuity proximate a first end of said housing, and a respective second encapsulation discontinuity proximate a second end of said housing.

17. The method as recited in claim 16, wherein the enclosing step comprises inserting said conductive elements in a pre-assembled shuffle device.

18. The method as recited in claim 16, wherein the enclosing step comprises encapsulating said conductive elements.

19. The method as recited in claim 18, wherein the encapsulating step comprises overmolding said housing over said third section.

20. The method as recited in claim 18, wherein the encapsulating step comprises the steps of:
   placing said third section in a tubular structure; and
   potting said third section within said tubular structure.

* * * * *